United States Patent [19]
Rowley et al.

[11] 3,914,072
[45] Oct. 21, 1975

[54] FLUID PUMPING ASSEMBLY

[75] Inventors: William N. Rowley, Palos Verdes Estates; Gordon F. Ehret, Alhambra, both of Calif.

[73] Assignee: Weil-McLain Company, Inc., Dallas, Tex.

[22] Filed: Nov. 19, 1974

[21] Appl. No.: 525,099

[52] U.S. Cl................ 417/423 R; 415/11; 277/65; 277/82
[51] Int. Cl.²......................................... F04D 29/10
[58] Field of Search......... 417/423 R, 424; 415/111, 415/113; 277/65, 82, 67, 133

[56] References Cited
UNITED STATES PATENTS

| | | | |
|---|---|---|---|
| 2,375,085 | 5/1945 | Curtis | 277/133 X |
| 2,407,218 | 9/1946 | Beier | 277/133 X |
| 3,071,075 | 1/1963 | Spring | 417/423 UX |
| 3,088,416 | 5/1963 | Danis | 415/113 UX |
| 3,371,612 | 3/1968 | Aller | 417/423 |

Primary Examiner—Alan Cohan
Attorney, Agent, or Firm—Lane, Aitken, Dunner & Ziems

[57] ABSTRACT

A fluid pump assembly in which an electrically-operated motor is operatively connected to an impeller disposed in the volute portion of a pumping housing. A seal plate of a dielectric material extends within an opening formed in the housing for insulating the housing from the electrical motor, and a seal assembly cooperates with the shaft assembly connecting the motor to the impeller for preventing the leakage of fluid from the housing. A sleeve of a dielectric material is molded integral over the shaft assembly and has a flanged portion extending radially outwardly to direct any fluid outwardly from the shaft assembly.

8 Claims, 2 Drawing Figures

FLUID PUMPING ASSEMBLY

BACKGROUND OF THE INVENTION

This invention relates to a pump assembly and, more particularly, to a pump assembly which is driven by an electrical motor for pumping water, or the like.

Electrically driven water pumps for use in systems in which persons physically contact the water in the system, such as in swimming pools, household water systems, lavatories, and the like, present potential safety hazards. This is largely due to the fact that any breakdown in the internal insulation of the motor can impart an electrical voltage to the output shaft of the motor which can be conducted through the shaft, the mounting bracket for the pump and motor, and the pump housing to the electrical conductive water supply.

Although various techniques have been proposed to insulate the drive shaft from the water in the system, these solutions have been less than completely effective. Also, even in situations where the output shaft of the electrical motor is effectively insulated from the water during normal conditions, a hazard still exists due to the possibility of water leaking from the pump housing, down the output shaft and to the motor. Also, this leakage leads to rust and corrosion as well as the accumulation of materials, through electrolytic action, on the motor shaft or the seal assembly surrounding the shaft.

SUMMARY OF THE INVENTION

The present invention is directed to a pump assembly of the above type which eliminates the above problems by effectively insulating the electrical motor from the pump housing, and therefore, from the water contained in the housing, while preventing any water leaking from the pump housing from contacting the motor or its output shaft.

Towards this end, the assembly of the present invention comprises a pump housing defining an opening, an impeller disposed in the housing, shaft means extending through the opening for operatively connecting the impeller to an electric motor, a seal plate of a dielectric material extending within the housing opening for insulating the housing from the electric motor, the seal plate defining an opening for receiving the shaft means, seal means cooperating with the shaft means and the seal plate for preventing the leakage of fluid from the housing, and a sleeve of a dielectric material extending over the shaft means and extending from the impeller to a point external of the seal plate opening, the sleeve having a flanged portion extending radially outward from a portion thereof external of the seal plate opening to direct any fluid radially outward from the shaft means.

DESCRIPTION OF THE PREFERRED EMBODIMENTS

Figure 1:
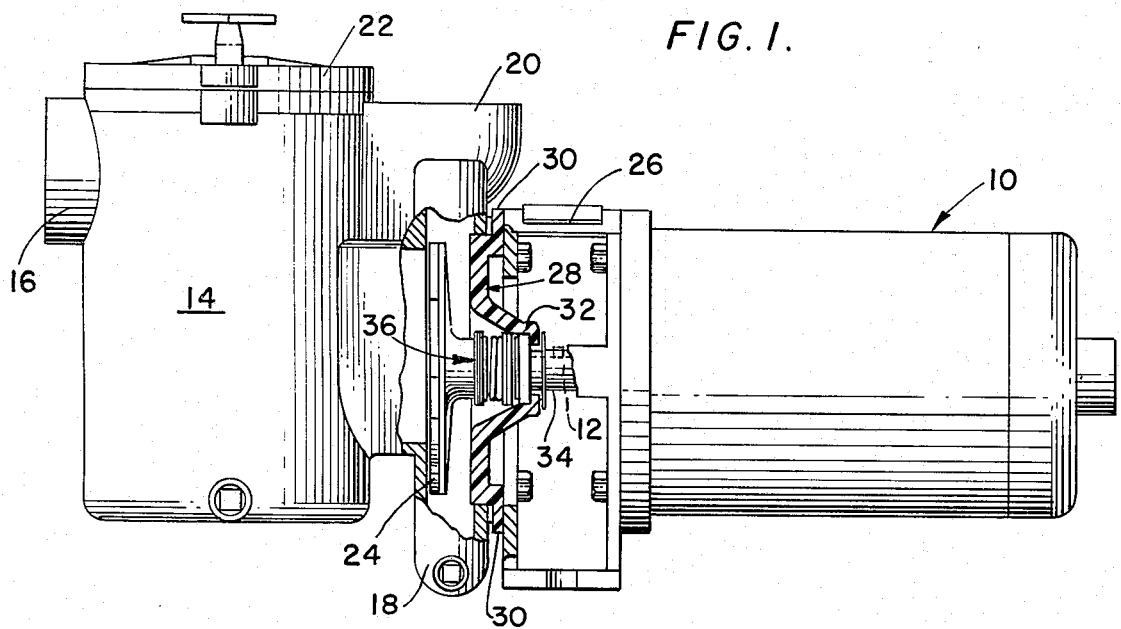
FIG. 1 is a partial elevational, partial sectional view depicting the pump assembly of the present invention.

Referring to FIG. 1, the reference numeral 10 refers in general to an electrically-operated motor having an output shaft 12 and being adapted to operate in a conventional manner in response to an electrical input to drive the shaft. A pump housing 14 is provided with an inlet 16 and a volute, or pumping, chamber 18 having an outlet 20. A lid 22 is provided on the top of the housing 14, it being understood that a filter basket or other type filter device can be provided in the housing. An impeller 24 is provided in the pumping chamber 18 and is adapted to pump water from the inlet 16 through the housing 14 and the pumping chamber 18, and out through the outlet 20 in a conventional manner, it being understood that pipes, hoses, or the like, may be connected to the inlet 16 and the outlet 20 to receive and discharge the water.

A metallic mounting bracket 26 extends between, and is bolted to, the pump housing 14 and the motor 10 to support the motor 10 relative to the pump housing. A seal plate 28 of a synthetic dielectric material extends within an opening formed in the pump housing 14 and has flange portions 30 extending between the mounting bracket 26 and the pump housing. The seal plate 28 has a hub portion 32 provided with a central opening which receives the output shaft 12 of the motor 10.

An extension shaft 34 extends over a portion of the output shaft 12 and operatively connects the latter shaft to the impeller 24, and a seal assembly 36 extends over a portion of the extension shaft to seal same from the water in the pumping chamber 18. Both the extension shaft 34 and the seal assembly 36 will be described in detail later.

The specifics of each of the above-mentioned components, along with the particular manner in which they are mounted relative to one another, will not be described in any further detail since they are fully described in U.S. patent application Ser. No. 509,121, filed on Sept. 25, 1974, by the present inventors, and assigned to the same assignee as the present invention. However, for the purposes of the present application, it should be noted that a plurality of insulating sleeves (not shown) extend around the shank portion of the bolts connecting the mounting bracket 26 to the pump housing 14, with the shank portions and the sleeves extending through the flange portions 30 of the seal plate 28, thus providing a complete insulation of the water in the volute portion 18 from the metallic support bracket 26. This is fully described in the above-identified application, the disclosure of which is hereby incorporated by reference.

Figure 2:
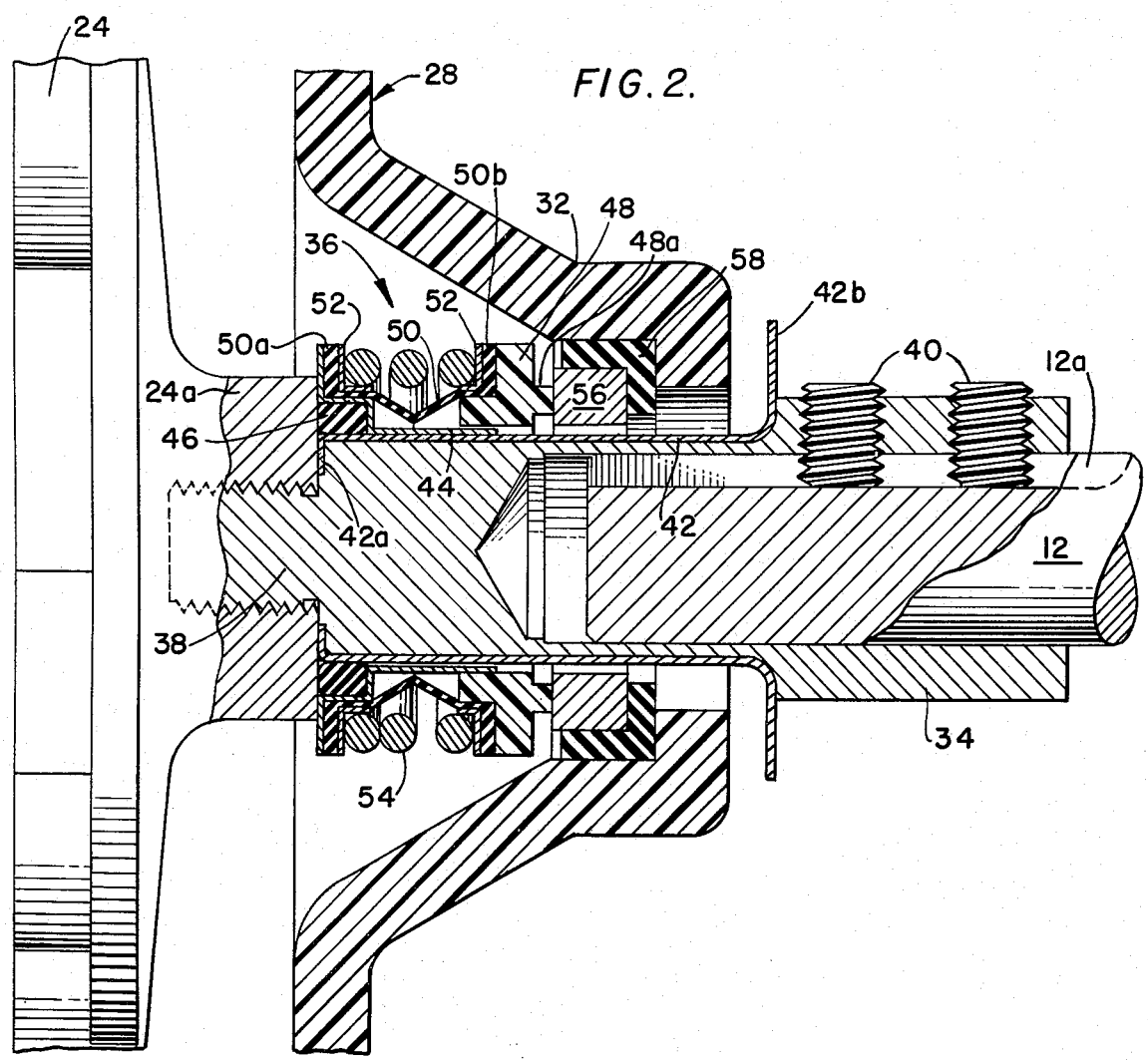
FIG. 2 is an enlarged sectional view of a portion of the assembly of FIG. 1.

As shown in FIG. 2, the extension shaft 34 is provided with a threaded stub portion 38 which threadably engages a corresponding internally threaded portion formed in the hub 24a of the impeller 24. A portion of the extension shaft 34 extends over the end portion of the drive shaft 12 and a pair of set screws 40 extend through threaded bores in the extension shaft and engage a slot 12a formed in the drive shaft 12 for securing the extension shaft to the output shaft. A sleeve 42 extends over a portion of the extension shaft 34 from the impeller hub 24a to a point external of the hub portion 32 of the seal plate 28. An inwardly directed flange 42a is formed at one end of the sleeve 42 and extends at the interface between the impeller hub 24a and a shoulder portion formed on the extension shaft 34. A flange 42b extends radially outwardly from the other end of the sleeve 42 with a portion thereof abutting a correspondingly formed shoulder portion on the extension shaft 34. It it understood that the shaft 12 and the shaft 34 are metallic while the sleeve 42 may be of a synthetic dielectric material and is molded over the corresponding portion of the extension shaft 34 in any conventional manner to render the sleeve integral with the shaft.

The shaft seal assembly 36 comprises a metallic sleeve 44 extending over the sleeve 42 and having a stepped portion which receives an O-ring seal 46 abutting the face of the impeller hub 24a. A washer 48 of a relatively hard plastic is provided over the sleeve 44 in a spaced relation to the stepped portion of the latter sleeve. A bellows 50 of a rubber material has two flanged portions 50a and 50b which respectively abut the stepped portion of the sleeve 44 and a corresponding stepped portion formed in the washer 48. A pair of support rings 52 press the flanged portions 50a and 50b of the bellows 50 against the sleeve 44 and the washer 48, respectively, under the action of a compression spring 54 extending between the rings 52 and around the bellows, thus urging the bellows 50 into an expanded condition.

An annular flange 48a is formed on the outer face of the washer 48 and engages a ceramic washer 56 which extends within a cup-shaped seal member 58. The inner diameter of the washer 56 and the seal member 58 are greater than that of the sleeve 42, and the outer surfaces of the seal member engage corresponding interior surfaces of the hub portion 32 of the seal plate 28. As a result, the washer 56 and the seal member 58 remain stationary during rotation of the output shaft 12 and the extension shaft 34 while the remaining portion of the seal assembly 36 rotates with the shafts.

In operation, the components of the seal assembly 36 are placed in their loaded condition shown in FIG. 2 under the action of the spring 54, and upon rotation of the shaft 12 and therefore the extension shaft 34, the assembly formed by the sleeve 44, the washer 48, the bellows 50, the rings 52, and the spring 54 rotate with the extension shaft 34, with the flange 48a of the washer 48 engaging the fixed ceramic disc 56 to prevent any of the water from escaping from the pumping chamber 18.

It is noted that the bellows 50, the washer 48, the O-ring 46, and the seal member 58 are all of a dielectric material, such as plastic or rubber, and therefore assist the sleeve 42 in electrically insulating the water in the pumping chamber 18 from the extension shaft 36, and therefore the shaft 12.

During the operation of the assembly of the present invention, it is noted that in the event there is a leakage of water from the chamber 18 through the shaft seal assembly 36, the water will tend to seep along the dielectric sleeve 42 until it reaches the outwardly directed flange portion 42b which, under the action of the rotation of the shaft, causes the water to be thrown outwardly by centrifugal force thus insuring that no water will leak to the shaft 12 and possibly the motor 10.

As a result of the foregoing, the electrical motor 10 and particularly its output shaft 12 is electrically insulated from the pumping chamber 18, in addition to being effectively sealed by the shaft seal assembly 36 and the sleeve 42.

It is understood that the dielectric synthetic material used in connection with the seal plate 20, the impeller 24, and the sleeve 42 can be of several known types, such as a fiberglass reinforced plastic, or other equivalent material.

It is also understood that variations may be made in the foregoing without departing from the scope of the invention. For example, the extension shaft 34, although described as being formed of metal, can also be of a dielectric synthetic material.

Of course, other variations of the specific construction and arrangement of the assembly disclosed above can be made by those skilled in the art without departing from the invention as defined in the appended claims.

We claim:

1. A fluid pump assembly comprising a pump housing defining an opening, an impeller disposed in said housing, shaft means extending through said opening for operatively connecting said impeller to an electric motor, a seal plate of a dielectric material extending within said opening for insulating said housing from said electric motor, said seal plate defining an opening for receiving said shaft means, seal means cooperating with said shaft means and said seal plate for preventing the leakage of fluid from said housing, and a sleeve of a dielectric material extending over said shaft means and extending from said impeller to a point external of said seal plate opening, said sleeve having a flanged portion extending radially outward from a portion thereof external of said seal plate opening to direct any fluid radially outward from said shaft means.

2. The assembly of claim 1 wherein said seal means includes a first portion secured to said shaft means and a second portion secured relative to said seal plate and permitting rotation of said shaft means.

3. The assembly of claim 1 wherein said shaft means comprises an output shaft driven by said motor, and an extension shaft connected to said impeller and to said output shaft.

4. The assembly of claim 1 wherein a surface of said seal plate engages the wall of said housing defining said opening in said housing.

5. The assembly of claim 1 further comprising a support bracket for supporting said motor relative to said housing, a portion of said seal plate extending between said support bracket and said housing.

6. The assembly of claim 1 wherein said sleeve is molded integral with said shaft means.

7. A fluid pump assembly comprising a pump housing defining an opening, an impeller disposed in said housing, shaft means extending through said opening for operatively connecting said impeller to an electric motor, seal means cooperating with said shaft means for preventing the leakage of fluid from said housing, and a sleeve of a dielectric material extending molded integral with said shaft means and extending from said impeller to a point external of said housing opening, said sleeve having a flanged portion extending radially outward from a portion thereof external of said housing to direct any fluid radially outward from said shaft means.

8. The assembly of claim 7 wherein said shaft means comprises an output shaft driven by said motor, and an extension shaft connected to said impeller and to said output shaft, said sleeve being molded integral with said extension shaft.

* * * * *

UNITED STATES PATENT OFFICE
CERTIFICATE OF CORRECTION

Patent No. 3,914,072          Dated October 21, 1975

Inventor(s) William N. Rowley, et al

It is certified that error appears in the above-identified patent and that said Letters Patent are hereby corrected as shown below:

In the claims, claim 7, line 54, after "extending" insert -- over and --

Signed and Sealed this ninth Day of March 1976

[SEAL]

Attest:

RUTH C. MASON
*Attesting Officer*

C. MARSHALL DANN
*Commissioner of Patents and Trademarks*